Aug. 4, 1970 Q. C. TURTLE 3,523,234
SOLID STATE SWITCH CONTROLLER FOR UNIVERSAL OR D.C. MOTORS
INCLUDING A UNIQUE TRIGGER AND REGULATOR THEREFOR
Filed Sept. 8, 1967
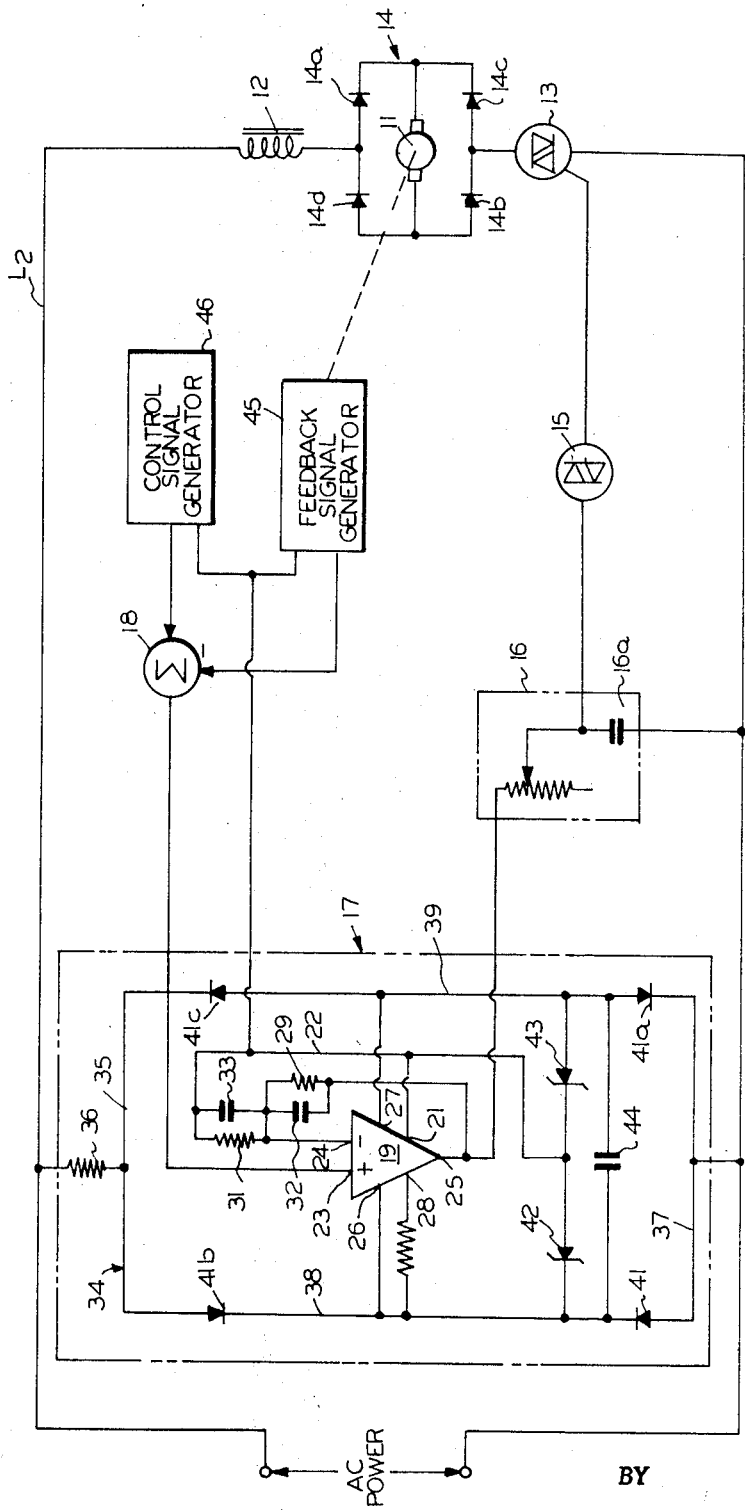
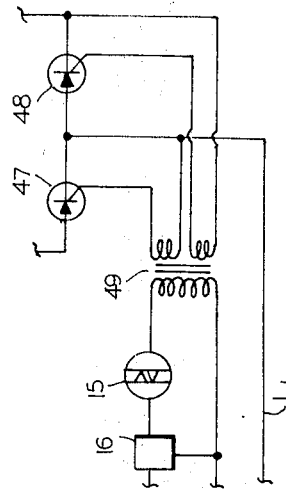
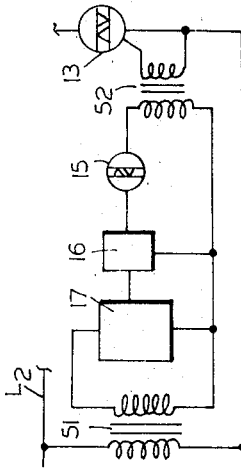
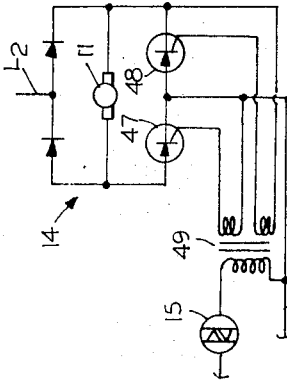
INVENTOR
QUENTIN C. TURTLE
BY *Dodge and Sons*
ATTORNEYS United States Patent Office 3,523,234
Patented Aug. 4, 1970

3,523,234
SOLID STATE SWITCH CONTROLLER FOR UNIVERSAL OR D.C. MOTORS INCLUDING A UNIQUE TRIGGER AND REGULATOR THEREFOR
Quentin C. Turtle, Cranston, R.I., assignor to General Signal Corporation, a corporation of New York
Filed Sept. 8, 1967, Ser. No. 666,447
Int. Cl. G05b 11/28
U.S. Cl. 318—681          5 Claims

ABSTRACT OF THE DISCLOSURE

Solid state controllers for DC or universal electric motors employing Diacs and Triacs, or equivalent static triggers and gate-controlled power switches, and on R-C timing network for controlling the firing angle of the trigger. A combination pulse generating input signal amplifying and voltage regulating unit supplies line synchronized pulses to the timing network. These pulses enable the network to vary in reverse senses, and in an amount dependent upon the magnitude of the input signal, the firing angle of the Diac during the positive and negative half cycles of the AC power. Inductive coupling between the DC control elements and the AC power lines may be provided to preclude ground loops.

BACKGROUND AND SUMMARY OF THE INVENTION

This invention relates to controllers for DC or universal electric motors.

Co-pending application Ser. No. 531,502, filed Mar. 3 1966, now Pat. 3,402,338, issued Sept. 17, 1968, discloses a solid state motor controller of the type employing a static, gate-controlled power switch which is gated by a static trigger whose firing angle is controlled by an R-C timing network. The power switch and the trigger usually are a Triac and a Diac, respectively. The controller also includes a generator which continuously supplies the timing network with regulated voltage pulses which are in synchronism with the AC power, and a control device which is arranged to inject directly into the timing network a variable control voltage. The control voltage is superimposed on the voltage pulses and has the effect of changing the firing angle of the Diac an amount dependent upon its magnitude. Since the length of the portion of each half cycle during which the Triac conducts varies with the firing angle of the Diac, the power received by the motor, and consequently the motor speed, is dependent upon the magnitude of the control signal.

When the controller is used in a high performance control system, for example, an industrial process controller wherein the motor positions a flow-regulating valve, it is embodied in a negative feedback circuit, and the control voltage is an error signal representative of the difference between the desired and the actual conditions of the final control element. Since high loop gain is ordinarily required in order to reduce deadband, the error signal must be amplified before it is injected into the timing network. With the controller just described, this requirement necessitates the inclusion of a separate, regulated power supply for the error signal amplifier. Obviously this is expensive.

The prior controller also is unsuited for use in high performance systems because it cannot provide economically the degree of voltage regulation required for small deadbands. The reason is that the pulse generator uses a rectifier bridge having two resistance arms; therefore, it must be supplied with a regulated input considerably higher than the breakover voltage of the Diac. Since the performance of the Zener diode regulating devices deteriorates as the voltage rating goes up, an acceptable degree of regulation can be achieved only by using a plurality of low voltage Zeners connected in series.

The primary object of this invention is to reduce the cost of amplifying the input signal in controllers of the type mentioned above. According to the invention, this object is accomplished by combining the signal amplifier, the voltage regulator and the pulse generator in a single integral circuit. This arrangement is inherently more economical than the prior scheme because common components perform the three functions of generating timing pulses, regulating line voltage, and supplying power to the amplifier. In the preferred embodiment, the combined unit employs a four-diode rectifier bridge which not only allows use of regulating Zener diodes having a rating closer to the breakover voltage of the Diac, and thus affords better voltage regulation, but also is less expensive than the bridge of the prior controller. The price differential is attributable to the fact that the four diodes can be purchased as a prepackaged unit which costs less and is easier to install than the individual resistors and diodes used previously. The preferred embodiment also is characterized by efficient voltage regulation and pulse generating schemes which keep heat losses to a minimum, and by isolating provisions which preclude creation of ground loops.

DESCRIPTION OF SPECIFIC EMBODIMENTS

Several embodiments of the invention are described herein with refreence to the accompanying drawing in which:

FIG. 1 is a wiring schematic of one form of a complete controller using the preferred amplifying, pulse generating and voltage regulating unit.

FIG. 2 is a wiring schematic showing an alternative form of the static power switching device.

FIG. 3 is a partial wiring schematic showing a modification of the FIG. 1 controller which reduces heat losses and precludes creation of ground loops.

FIG. 4 is a wiring schematic illustrating the manner in which ground loops can be prevented in controllers using the power switching scheme of FIG. 2.

The controller illustrated in FIG. 1 is associated with a series motor whose armature 11 and field 12 are connected in an AC power circuit including leads $L_1$ and $L_2$ and Triac 13. One of the windings of the motor, in this case the armature 11, is connected across the output junctions of a bridge rectifier 14. This arrangement permits reversal of the direction of rotation of the motor. Triac 13 is gated by a Diac 15 which is fired in opposite directions by pulses supplied from an R–C timing network 16. This network receives line-synchronized voltage pulses from the amplifying, pulse generating and regulating unit 17. The output of unit 17 is in the form of a clipped sine wave which, under steady state or zero error conditions, is symmetrical about the zero voltage axis and has an amplitude which is either insufficient to cause network 16 to fire Diac 15 or which enables the network to fire Diac 15 very late in each half cycle. Under transient conditions, unit 17 produces an asymmetrical output wave which is displaced relative to the zero voltage axis an amount and in a direction dependent upon the magnitude and the polarity of the error signal supplied by summation network 18. This effective shift of the output wave causes timing network 16 to fire Diac 15 earlier on half cycles of one polarity and to completely prevent the Diac from firing on the opposite half cycles of the AC power.

The amplifying, generating and regulating unit 17 includes an operational amplifier 19 having a common connection 21 to which is attached a bus 22, positive and negative input connections 23 and 24 which are joined, respectively, to the summation network 18 and bus 22, an output connection 25 which leads to timing network 16, plus and minus power supply connections 26 and 27, and a trim connection 28. The amplifier is provided with a minor feedback path containing a resistor 29, and a second resistor 31 is interposed in the circuit of negative input connection 21. The ratio of the values of these resistors determines the steady state gain of ampliger 19, and the gain is set high enough to insure that the amplifier operates in the nonlinear or saturated mode. The gain resistors 29 and 31 are shunted by capacitors 32 and 33, respectively, which are sized to provide the degree of lead-lag compensation required for stable operation. This combination amplifying and lead-lag compensating network is the subject of copending application Ser. No. 665,886, filed Sept. 6, 1967.

Operational amplifier 19 is supplied with power from a rectifier bridge 34 comprising an input section 35 which is connnected with lead $L_2$ through a current-limiting resistor 36, a second input section 37 which is connected directly with lead $L_1$, positive and negative output sections 38 and 39, respectively, and four interconnecting arms containing diodes 41, 41a, 41b and 41c. The output voltages of bridge 34 are regulated by a pair of Zener diodes 42 and 43, one of which is connected between common bus 22 and output section 38, and the other of which is connected between the common bus and output section 39. A smoothing capacitor 44 connected across the two output sections 38 and 39 filters the power supplied to amplifier 19.

In use, the electric motor is connected to position a load, such as a flow-regulating valve, and to drive a positional feedback signal generator 45. When the load is in a position corresponding to the control signal supplied by generator 46, amplifier 19 receives no input from network 18, and the voltages at the output and common connections 25 and 21 will be equal. Under this condition, unit 17 supplies a symmetrical output wave to timing network 16. During each half cycle of the AC power, capacitor 16a will be charged in one direction or the other, but the voltage across the capacitor either will not reach the breakover voltage of Diac 15, or will reach that value very late in the half cycle. Therefore, Triac 13 either will not fire, and the motor will remain at rest, or the Triac will be conductive for a short time at the end of each half cycle, and the motor will dither (i.e., tend to rotate in opposite directions on successive positive and negative half cycles).

When the control signal supplied by generator 46 is increased, and summation network 18 produces an error signal, amplifier 19 will raise the voltage at output connection 25 relative to the voltage at common connection 21. This has the effect of shifting the output wave of unit 17 so that the magnitudes of the positive and negative pulses are increased and decreased, respectively. Now, on each half cycle in which lead $L_2$ is positive with respect to lead $L_1$, capacitor 16a will be charged to the breakover voltage of Diac 15, and the latter will deliver a high current, short duration positive pulse to the gate of Triac 13. As a result, the Triac will be rendered conductive in the direction of lead $L_1$, and current will flow through field winding 12, diode 14a, armature 11, and diode 14b. On the negative half cycles, i.e., when lead $L_1$ is positive with respect to lead $L_2$, the negative pulses delivered to timing network 16 will not charge capacitor 16a to the breakover voltage of Diac 15, and Triac 13 will remain nonconductive. Since, under these conditions, the motor receives power only on the positive half cylcles, it will rotate in one direction. The speed of rotation depends upon the length of the portion of each positive half cycle during which the Triac is conductive and this, in turn, is a function of the magnitude of the error signal supplied to amplifier 19.

When the control signal furnished by generator 46 is reduced below the feedback signal, the polarity of the error signal supplied to amplifier 19 reverses, and the voltage at output connection 25 is reduced below that at common connection 21. In this case, the magnitude of the positive portion of the output wave delivered to network 16 is reduced, and the magnitude of the negative portion is increased. Therefore, Diac 15 now fires only on the negative half cycles (i.e., when lead $L_1$ is positive relative to lead $L_2$), and Triac 13 is rendered conductive in the direction of lead $L_2$. Under these conditions, current in the power circuit flows through diode 14c, armature 11, diode 14d, and field winding 12, and the motor rotates in the opposite direction. As in the previous case, the speed of rotation depends upon the magnitude of the error signal.

The specific amplifying, generating and regulating unit 17 shown in FIG. 1 is the preferred design, but there are alternatives for certain of its parts. For example, operational amplifier 19 can be replaced by a linear amplifier in cases where lead-lag compensation is not required, and the upper diodes 41b and 41c of bridge 34 can be replaced by voltage dropping resistors if the resulting energy losses, increased cost and heating effect can be tolerated. The illustrated voltage regulating scheme affords very good regulation because the Zener diodes 42 and 43 need be rated for only 15 volts, but, in cases where deadband requirements are more liberal and poorer regulation can be accepted, the diodes 42 and 43 can be replaced by voltage dropping resistors, and a single 30 volt Zener diode can be connected across the bridge output sections 38 and 39. Of course, this alternative also is wasteful of energy and may pose heat dissipation problems.

It also should be noted that, in the reversible embodiments of the invention, Diac 15 can be replaced by other static triggering means, such as the SBS (silicon bidirectional switch), and Triac 13 can be replaced by a pair of silicon controlled rectifiers which are gated from a pulse transformer. The last mentioned alternative is shown in FIG. 2, wherein the two silicon controlled rectifiers 47 and 48 are embodied in rectifier bridge 14 and thus eliminate two of the diodes formerly employed in this circuit. The SCR's 47 and 48 are gated on the positive and negative half cycles, respectively, by pulses generated in the secondary windings of a pulse transformer 49 whose primary is connected in a circuit controlled by Diac 15.

Although the controller shown in FIG. 1 is satisfactory from most viewpoints, it is inefficient and generates a considerable amount of heat which is dissipated from resistor 36. This is so because the control section including unit 17, network 16 and Diac 15 operates at a voltage level much lower than line voltage, and the voltage-reducing function is performed solely by resistors 36. The amount of power dissipated is so great that resistor 36 must have a ten-watt rating. This disadvantage is eliminated in the preferred controller shown in FIG. 3, wherein a step-down transformer 51 is used to reduce the voltage applied to the control section to about 60 volts. At this lower power level, the rating of resistor 36 can be reduced to five watts. The inclusion of transformer 51 and the companion transformer 52, which couples Diac 15 with the gate circuit of Triac 13, eliminates all DC paths between the control section and the power lines $L_1$ and $L_2$, and thus prevents ground loops in cases where signal generator 46 has a DC connection between the signal output and the AC lines. This isolation scheme can also be employed in controllers using the power switching device of FIG. 2. In this case, however, it is necessary to add only the transformer 51 since pulse transformer 49, when connected as shown in FIG. 4, inherently performs the DC isolation function at the output end of the control section.

While I have described in detail the preferred and several alternative embodiments of the inventive concept, it should be understood that the following claims provide the true measure of the scope of the invention.

I claim:

1. In a controller for a DC or universal motor of the type including an AC power circuit ($L_1$, $L_2$) containing the motor and controlled by a static, gate-controlled power switching means (13 or 47–49), static triggering means (15) for gating said switching means, and a timing network (16) for controlling the firing angle of the triggering means, the improvement which comprises a unitary circuit for amplifying a motor control signal, providing regulated power for said amplifying purpose, and providing to said timing network square wave voltage pulses composed of regulated, line synchronized pulses on which is superimposed a DC voltage representative of the motor control signal, said unitary circuit comprising (a) a rectified bridge (34) including positive and negative output sections (38 and 39), first and second input sections (35 and 37) connected with the AC power circuit, two arms connecting the output sections with the first input section (35) and containing voltage dropping devices (41b and 41c), and two arms connecting the output sections with the second input section (37) and containing reversely set diodes (41 and 41a);
   (b) a current-limiting resistance (36) in the connection between the first input section (35) and the AC power circuit;
   (c) an amplifier (19) having positive and negative supply connections (26 and 27) joined, respectively, with the positive and negative output sections, and input, output and common connections (23, 25 and 21);
   (d) Zener diode voltage regulating means (42, 43) interconnecting the common connection (21) and the two output sections (38 and 39) and serving to regulate the voltage between each output section and the common connection;
   (e) means for connecting the timing network (16) between the output connection (25) of the amplifier and the second input section (37); and
   (f) means for applying the motor control signal between the input (23 and common (21) connections of the amplifier (19).

2. The improve controller defined in claim 1 in which the voltage dropping devices in said two arms of the bridge (34) are reversely set diodes (41b and 41c).

3. The improved controller defined in claim 1 in which the voltage regulating means comprises a pair of Zener diodes (42 and 43) connected between the common connection (21) and the two output sections (38 and 39).

4. The improved controller defined in claim 1 in which
   (a) the input sections (35 and 37) of the bridge are connected with the AC power circuit through a step-down transformer (51); and
   (b) the static triggering means (15) is coupled to the gate of the power switching means (13 or 47, 48) through a transformer (52 or 49).

5. The improved controller defined in claim 1 in which
   (a) the voltage dropping devices in said two arms of the bridge are reversely set diodes (41b and 41c);
   (b) the voltage regulating means comprises a pair of Zener diodes (42 and 43) connected between the common connection (21) and the two output sections (38 and 39);
   (c) the input sections (35 and 37) of the bridge are connected with the AC power circuit through a step-down transformer (51); and
   (d) the static triggering means (15) is coupled to the gate of the power switching means (13 or 47, 48) through a transformer (52 or 49).

References Cited

UNITED STATES PATENTS

| | | | |
|---|---|---|---|
| 3,239,742 | 3/1966 | Mierendorf et al. | 318—345 X |
| 3,241,024 | 3/1966 | Schade et al. | 318—345 X |
| 3,353,078 | 11/1967 | Maynard | 318—345 X |
| 3,402,338 | 9/1968 | Thoresen | 318—345 X |
| 3,403,315 | 9/1968 | Maynard | 318—345 X |
| 3,431,475 | 3/1969 | Wesner. | |

THOMAS E. LYNCH, Primary Examiner

U.S. Cl. X.R.

318—345